United States Patent
Son et al.

(10) Patent No.: US 7,985,511 B2
(45) Date of Patent: Jul. 26, 2011

(54) DIRECT OXIDATION FUEL CELL SYSTEM

(75) Inventors: In-Hyuk Son, Suwon-si (KR); Si-Hyun Lee, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1341 days.

(21) Appl. No.: 11/491,441

(22) Filed: Jul. 21, 2006

(65) Prior Publication Data

US 2007/0026270 A1 Feb. 1, 2007

(30) Foreign Application Priority Data

Jul. 27, 2005 (KR) ........................ 10-2005-0068551

(51) Int. Cl.
*H01M 8/02* (2006.01)
*H01M 8/04* (2006.01)
*H01M 8/10* (2006.01)
*H01M 8/22* (2006.01)
*H01M 8/24* (2006.01)

(52) U.S. Cl. ........ 429/448; 429/400; 429/428; 429/443; 429/444; 429/452; 429/454; 429/456; 429/462; 429/479; 429/484; 429/487; 429/490; 429/502; 429/523; 429/524; 429/525; 429/526; 429/527

(58) Field of Classification Search .................... 429/12, 429/13, 34, 400, 428, 443, 444, 447, 448, 429/452, 454, 456, 462, 484, 487, 490, 502, 429/523–527, 479
See application file for complete search history.

(56) References Cited

U.S. PATENT DOCUMENTS

| | | | |
|---|---|---|---|
| 6,146,781 A * | 11/2000 | Surampudi et al. | 429/35 |
| 6,468,681 B1 | 10/2002 | Horiguchi | |
| 6,569,552 B2 | 5/2003 | Kato et al. | |
| 2002/0127442 A1 * | 9/2002 | Connor et al. | 429/12 |
| 2003/0044672 A1 * | 3/2003 | Fukumoto et al. | 429/40 |
| 2004/0033397 A1 * | 2/2004 | Colbow et al. | 429/15 |
| 2005/0089743 A1 | 4/2005 | Lee | |

(Continued)

FOREIGN PATENT DOCUMENTS

CN 1609754 A 4/2005

(Continued)

OTHER PUBLICATIONS

Patent Abstracts of Japan, Publication No. 2003-123821; Date of Publication: Apr. 25, 2003; in the name of Norimasa Yamamoto et al.

(Continued)

*Primary Examiner* — Jerry Lorengo
*Assistant Examiner* — Jared Wood
(74) *Attorney, Agent, or Firm* — Christie, Parker & Hale, LLP

(57) ABSTRACT

The present invention relates to a direct oxidation fuel cell system including at least one electricity generating element including at least one membrane-electrode assembly which includes an anode and a cathode on opposite sides of a polymer electrolyte membrane, and a separator. The direct oxidation fuel cell generates electricity through an electrochemical reaction of a fuel and an oxidant. An oxidant supplier supplies the electricity generating element with the oxidant. A fuel supplier supplies the anode with a combination of fuel and hydrogen to provide improved power output.

14 Claims, 5 Drawing Sheets

U.S. PATENT DOCUMENTS

2006/0083958 A1* 4/2006 Noh .................................. 429/12
2006/0166045 A1* 7/2006 Ryoichi ............................ 429/9

FOREIGN PATENT DOCUMENTS

| JP | 2001-085033 | | 3/2001 |
|---|---|---|---|
| JP | 2003-123821 | | 4/2003 |
| KR | 2002-0056122 | | 7/2002 |
| KR | 10-2004-0009653 | | 1/2004 |
| WO | WO2005/008817 | * | 1/2005 |
| WO | WO 2005-040314 A2 | | 5/2005 |
| WO | WO 2005/040314 A2 | * | 5/2005 |

OTHER PUBLICATIONS

Korean Patent Abstracts, Publication No. 1020020056122 A; Date of Publication: Jul. 10, 2002; in the name of Yong Jun Hwang et al.
Korean Patent Abstracts, Publication No. 1020040009653 A; Date of Publication: Jan. 31, 2004; in the name of Chang Yong Jang.
Jin, J., et al., *Hydrogen storage for portable Fuel Cell*, Youth Hyforum, Sep. 19, 2003, pp. 170-173, with English abstract.
SIPO Office action dated Sep. 11, 2009, for corresponding Chinese application 2006101375024, noting listed references in this IDS.

* cited by examiner

DIRECT OXIDATION FUEL CELL SYSTEM

CROSS-REFERENCE TO RELATED APPLICATION

This application claims priority to and the benefit of Korean Patent Application No. 10-2005-0068551 filed in the Korean Intellectual Property Office on Jul. 27, 2005, the entire content of which is incorporated herein by reference.

FIELD OF THE INVENTION

The present invention relates to a direct oxidation fuel cell system. More particularly, the present invention relates to a direct oxidation fuel cell system with high power output.

BACKGROUND OF THE INVENTION

A fuel cell is a power generation system for producing electrical energy through an electrochemical redox reaction of an oxidant and hydrogen. The hydrogen may be provided in a hydrocarbon-based material such as methanol, ethanol, or natural gas. Such a fuel cell is a clean energy source that can replace energy sources that use fossil fuels. A fuel cell includes a stack composed of one or more unit cells, and can produce various ranges of power output. Since a fuel cell may have an energy density that is four to ten times higher than a small lithium battery, fuel cells may be used as small, portable power sources.

Examples of fuel cells include polymer electrolyte membrane fuel cells (PEMFC) and direct oxidation fuel cells (DOFC). The direct oxidation fuel cell includes a direct methanol fuel cell which uses methanol as a fuel.

The polymer electrolyte fuel cell has an advantage of high energy density, but it also has problems in that hydrogen gas must be carefully handled, and generally requires accessory facilities such as a fuel reforming processor for reforming methane or methanol, natural gas, and the like in order to produce hydrogen as the fuel gas.

However, a direct oxidation fuel cell offers the advantages of easy handling of the fuel, it is capable of operating at room temperature due to its low operation temperature, and it does not need additional fuel reforming processors. However, a direct oxidation fuel cell has a lower energy density than a polymer electrolyte fuel cell.

In a fuel cell, the stack that generates electricity generally includes several to scores of unit cells stacked together, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) located on opposite sides of an electrolyte membrane.

The anode is supplied with a fuel, and the fuel is adsorbed on a catalyst thereof and oxidized to produce protons and electrons. The electrons are transferred to the cathode via an out-circuit, and the protons are transferred to the cathode through the polymer electrolyte membrane. The cathode is supplied with an oxidant, and the oxidant, protons, and electrons are reacted on a catalyst at the cathode, producing electricity along with water.

The above information disclosed in this Background section is only for enhancement of understanding of the background of the invention, and therefore it should be understood that the above information may contain information that does not form the prior art that is already known in this country to a person or ordinary skill in the art.

SUMMARY OF THE INVENTION

An embodiment of the present invention provides a direct fuel cell system with high power output.

According to an embodiment of the present invention, a direct oxidation fuel cell system is provided which includes at least one electricity generating element, a fuel supplier, and an oxidant supplier. Each electricity generating element includes a cathode and an anode on either side of a polymer electrolyte membrane. It generates electricity through oxidation of a fuel and reduction of an oxidant. The fuel supplier includes a source of both fuel and hydrogen, and supplies the electricity generating element with the combination of fuel and hydrogen. The oxidant supplier supplies the electricity generating element with an oxidant.

DETAILED DESCRIPTION

Figure 1:
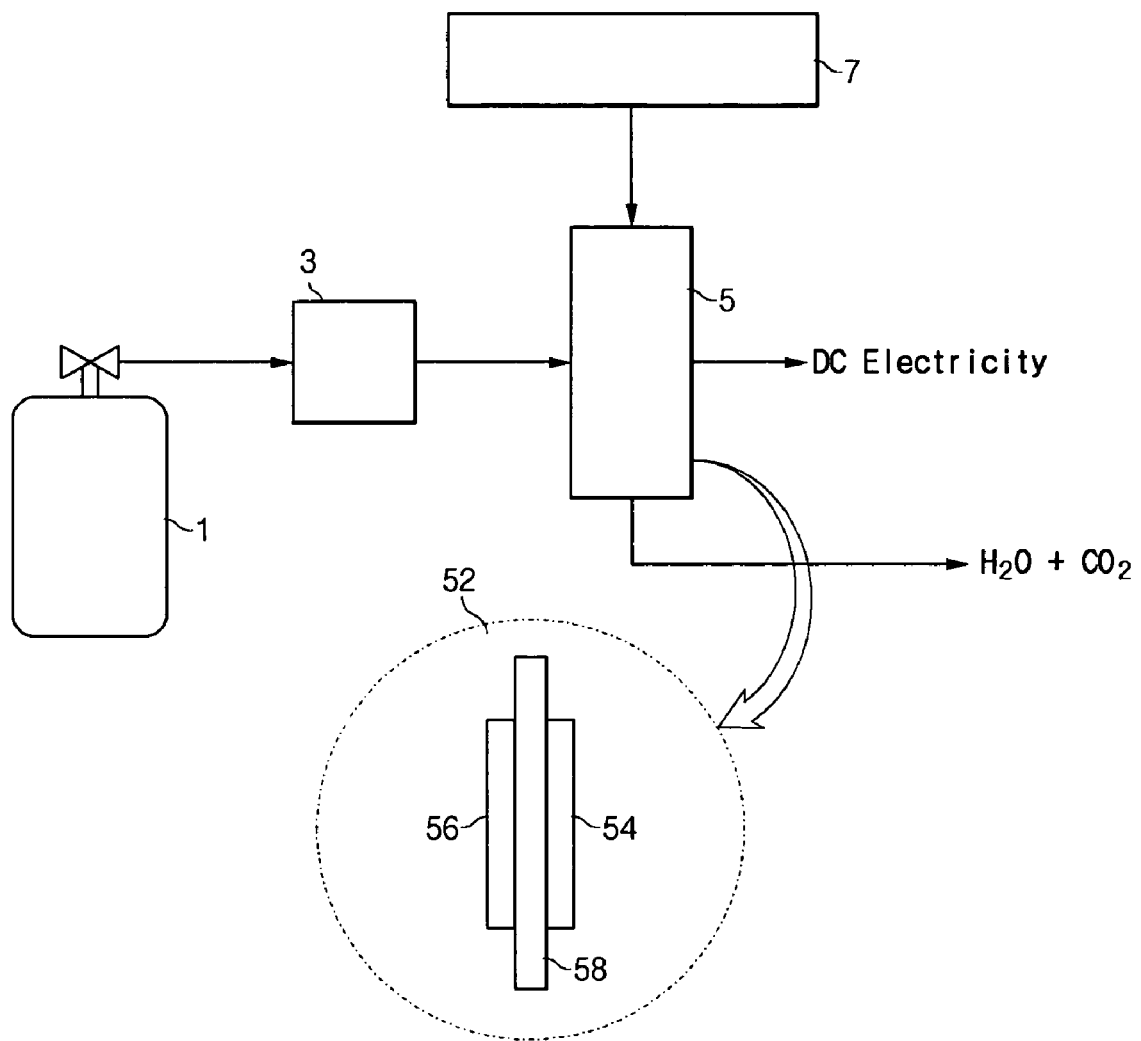
FIG. 1 illustrates one embodiment of the present invention.

The present invention relates to a direct oxidation fuel cell in which an anode is generally supplied with a hydrocarbon fuel to generate protons through oxidation of the fuel. The protons react with oxygen at a cathode to generate electricity along with water. However, because a direct oxidation fuel cell generally has a slow reaction speed, it generally produces low power. In addition, a direct oxidation fuel cell tends to overuse a metal catalyst.

Therefore, in order to increase the power output of a direct oxidation fuel cell, the present invention injects hydrogen gas into the fuel that is supplied to the anode. According to the present invention, a fuel cell system includes at least an electricity generating element, a fuel supplier, and an oxidant supplier. The electricity generating element includes at least one membrane-electrode assembly and a separator, and generates electricity through oxidation of a fuel and reduction of an oxidant. Each membrane-electrode assembly includes an anode and a cathode on opposite sides of a polymer electrolyte membrane.

The fuel supplier includes a fuel and a hydrogen source, and supplies the anode with a fuel and hydrogen, and the oxidant supplier supplies the electricity generating element with an oxidant.

Hereinafter, each of the fuel and oxidant suppliers is illustrated in more detail.

The fuel supplier includes the fuel and the hydrogen source, and supplies the anode with a combination of fuel and hydrogen. According to the present invention, the fuel includes a hydrocarbon fuel such as methanol, ethanol, dimethoxyethane, or the like. Such fuels are generally used for a direct oxidation fuel cell. The fuel may be provided in either a liquid or gaseous form. Where the fuel is provided as a liquid, water may be added to increase oxidation.

The hydrogen source may include a direct hydrogen source, and may include hydrogen gas stored as a liquid or gas, or hydrogen stored in a hydrogen-storing material. Such a hydrogen-storing material may generate hydrogen through a reaction, and may include a material such as $NaBH_4$, hydrogen-storing carbon nanotubes, a metal hydrate, or a combination thereof. The metal hydrate may include a metal such as Al or Be, but is not limited to such materials.

The hydrogen source may also include an indirect source such as where hydrogen is generated through a reformer catalyst layer or supplied by protons, which are generated when a part of a fuel crossing over from an anode to a cathode is electrochemically oxidized at a catalyst layer of the cathode, and moves through a polymer electrolyte membrane to the anode where it combines with electrons at the anode, and is reduced to hydrogen gas.

Alternatively, hydrogen may be supplied by a stack including a membrane-electrode assembly having an open region with no catalyst. In other words, at the open region, protons supplied from an anode remain in an excess amount, return to the anode, and are then combined with electrons and reduced, resulting in the generation of hydrogen gas.

When the hydrogen source is hydrogen gas, it may be added in an amount from 0.1 to 10 parts by volume based on 100 parts by volume of a liquid fuel according to the Standard Test Method (STM). Here, the STM indicates standard cubic centimeters per minute (SCCM, that is, an amount of gas discharged at 0° C. under one atmospheric pressure for one minute is equal to 1 $cm^3$).

When the hydrogen source is supplied as a compressed liquid or by a hydrogen-storing material, it may be added in an amount from 1 to 70 parts by weight, and preferably in an amount from 1 to 30 parts by weight based on 100 parts by weight of fuel.

When the hydrogen source is supplied in an amount over the above amount, the liquid fuel may not be supplied smoothly, thereby decreasing power density. Also, the liquid fuel may remain unreacted, lowering the efficiency of the fuel usage.

In this way, when the combination of hydrogen and fuel is injected into an anode, the hydrogen itself acts as a fuel, increasing power output, and also acts as a catalyst, promoting generation of hydrogen from the fuel. Therefore, as the hydrogen may increase oxidation speed of the fuel, and thereby proton generation from the fuel, there may be a sharply reduced crossover of the fuel, which occurs when the unreacted fuel at the anode crosses over to the cathode and is oxidized there.

Furthermore, as hydrogen is added to a fuel, the pH of the fuel is acidic, and in one embodiment, the pH is 5.6 or less.

Figure 2:
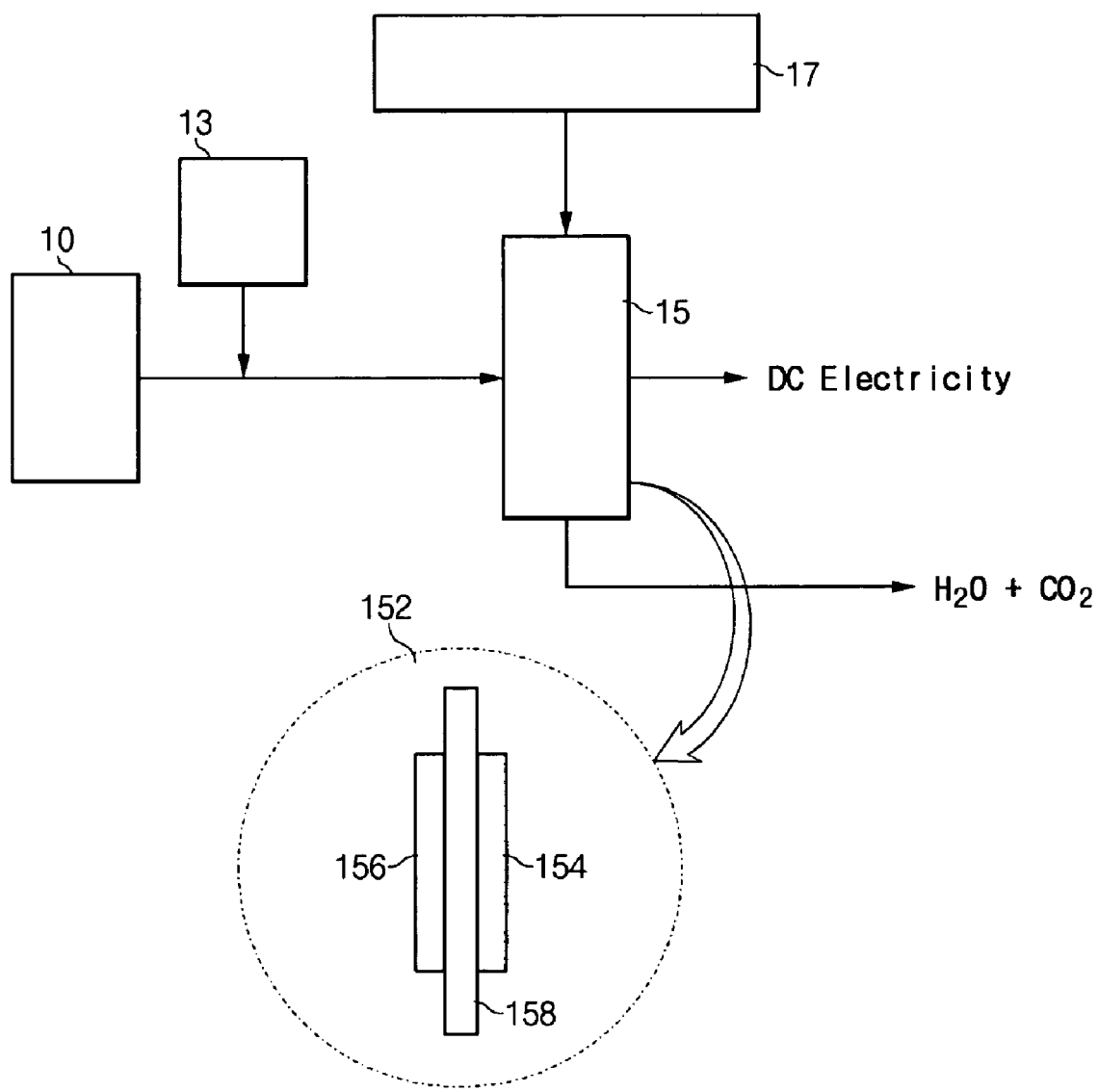
FIG. 2 illustrates another embodiment of the present invention.
Figure 3:
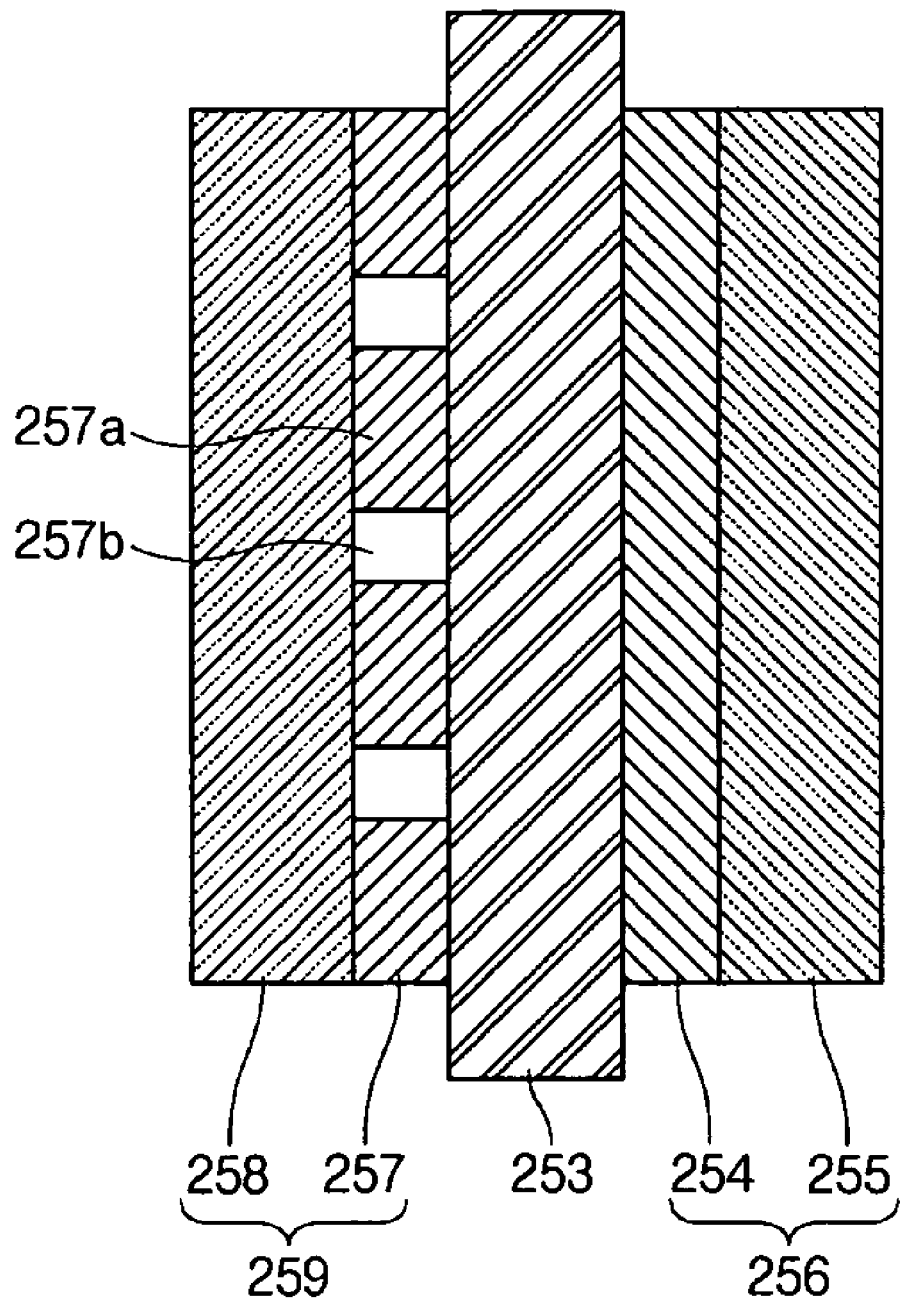
FIG. 3 is a cross-sectional view schematically illustrating a membrane-electrode assembly of a fuel cell system according to the present invention.
Figure 4:
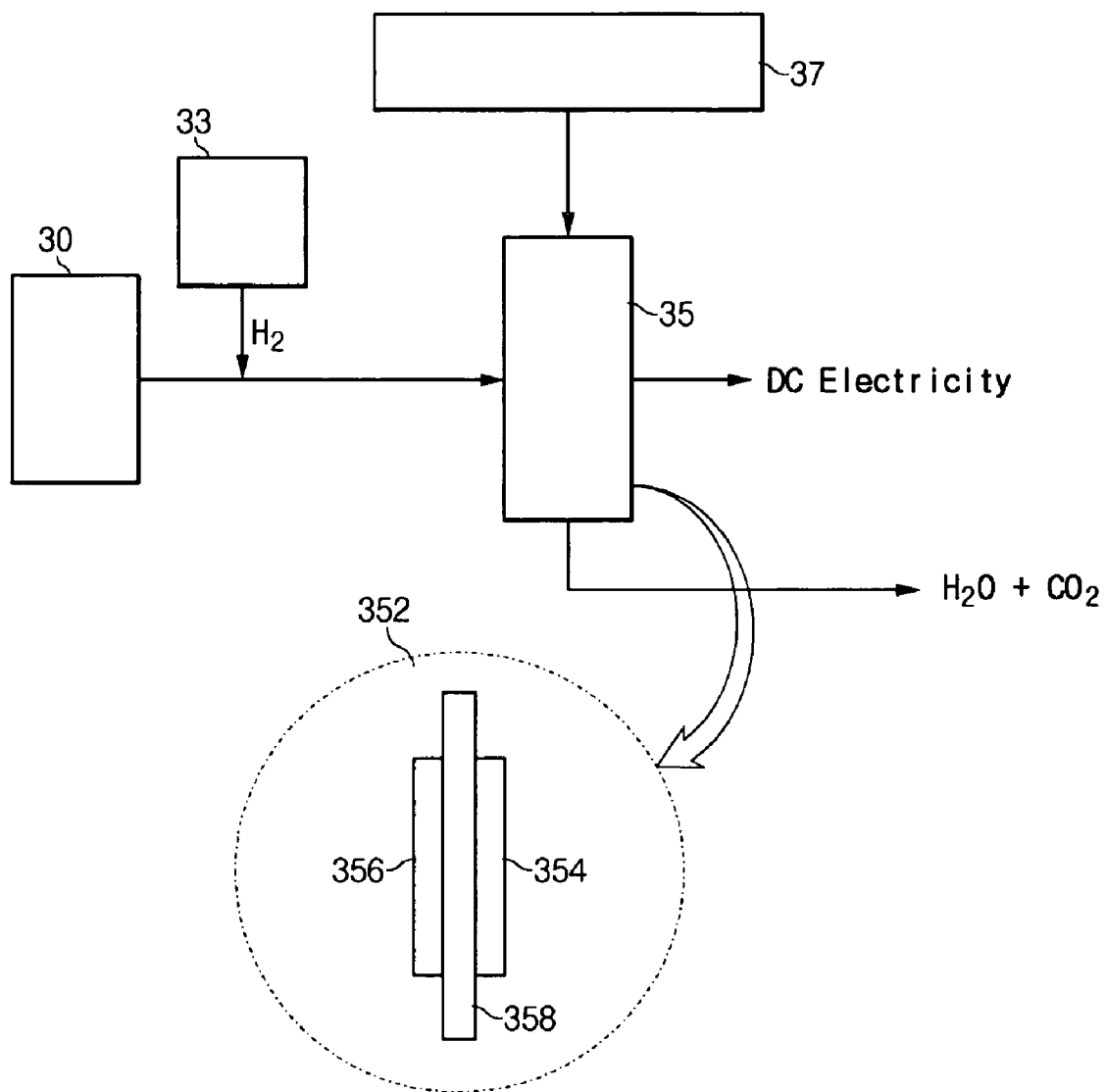
FIG. 4 illustrates still another embodiment of the present invention.

Referring to FIGS. 1 to 4, methods for injecting the combination of fuel and the hydrogen source into an anode are illustrated. FIGS. 1 to 3 show direct addition methods, and FIG. 4 shows an indirect addition method.

FIG. 1 shows one embodiment of the direct addition method. As shown in FIG. 1, a fuel and the hydrogen source are mixed together in a fuel supplier 1. In this embodiment, the hydrogen source is provided as a compressed liquid. The mixture of the fuel and the hydrogen source is supplied into a stack 5 via a mass flow controller (MFC) 3. In the stack 5, the mixture of the hydrogen source and the fuel is injected into an anode 54 of a membrane-electrode assembly 52 in the stack 5. In addition, an oxidant such as an oxygen-containing gas 7 is injected into a cathode 56 of the membrane-electrode assembly 52 in the stack 5. Then, $H^+$ ions are generated at the anode 54 and move through a polymer electrolyte membrane 58 toward the cathode 56 where they react with oxygen injected into the cathode 56, producing water. Accordingly, the stack 5 emits $H_2O$ and $CO_2$, which are generated during the overall reaction.

FIG. 2 shows another embodiment of a direct addition method. As shown in FIG. 2, a fuel is supplied from a fuel supplier 10, hydrogen gas is directly added thereto from a hydrogen gas supplier 13, and the mixed fuel is supplied to a stack 15. There, the mixture of hydrogen gas and fuel is injected into an anode 154 of a membrane-electrode assembly 152 in the stack 15. In addition, oxygen-containing gas 17 is injected into a cathode of the membrane-electrode assembly 152 in the stack 15. Then, $H^+$ ions are generated from the anode 154 and move through a polymer electrolyte membrane 158 to the cathode 156 where they react with oxygen injected into the cathode 156, producing water. Accordingly, the stack 15 emits $H_2O$ and $CO_2$, which are generated during the overall reaction.

According to the embodiment illustrated in FIG. 2, in another embodiment, the membrane-electrode assembly may have the structure illustrated in FIG. 3. According to FIG. 3, the membrane-electrode assembly 252 includes an anode 256 and a cathode 259, and a polymer electrolyte membrane 253 interposed therebetween. The anode 256 includes an anode catalyst layer 254 and an anode substrate 255, and the cathode 259 also includes a cathode catalyst layer 257 and a cathode substrate 258. The cathode catalyst layer includes a catalyst region 257a and an open region 257b with no catalyst. When the anode 256 is supplied with a fuel, the fuel is oxidized, generating $H^+$ ions at the anode catalyst layer 254. The $H^+$ ions pass through the polymer electrolyte membrane 253 and reach the cathode 259. However, the $H^+$ ions reaching the open region 257b of the cathode 259 are not oxidized and return to the anode 256, being reduced into hydrogen. In this way, a stack including the membrane-electrode assembly 252, which includes the cathode 259 having the catalyst layer 257 with the open region 257b, may generate more hydrogen.

FIG. 4 shows an embodiment according to the indirect addition method. As shown in FIG. 4, a fuel is supplied from a fuel supplier 30, and a hydrogen-containing material is supplied from a hydrogen-containing material supplier 33 and added to the fuel. The mixture of the fuel and the hydrogen-containing material is then supplied into a stack 35. Alternatively, hydrogen generated from the hydrogen containing material in the hydrogen-containing material supplier 33 may be added to the fuel. The mixture of the fuel and the hydrogen-containing material or hydrogen generated therefrom is injected into an anode 354 of a membrane-electrode assembly 352 in the stack 35, and an oxygen-containing gas 37 as an oxidant is also injected into a cathode 356 of the membrane-electrode assembly 352 in the stack 35. Then, $H^+$ ions are produced at the anode, and they pass through the polymer electrolyte membrane 358 and reach the cathode 356, producing $H_2O$. Accordingly, the stack 5 emits $H_2O$ and $CO_2$, which are generated during the overall reaction.

Next, the electricity generating element generates electricity through an electrochemical reaction of the fuel and the oxidant. The electricity generating element includes a membrane-electrode assembly and two separators positioned at respective sides thereof. The electricity generating element generally includes multiple membrane-electrode assemblies and separators, which together form a stack.

The membrane-electrode assembly includes an anode and a cathode on opposite sides of a polymer electrolyte membrane. The anode and cathode generally include an electrode substrate (that is, a backing layer) and a catalyst layer formed thereon. The electrode substrate supports the electrode, and also helps distribute the fuel and the oxidant to catalyst layers to help the fuel and oxidant more easily approach the catalyst layer. As for the electrode substrate, a conductive substrate is used, for example carbon paper, carbon cloth, carbon felt, or metal cloth (a porous film including metal cloth fiber or a metalized polymer fiber), but it is not limited thereto.

The catalyst in the catalyst layer may be a metal catalyst to help the related reaction (oxidation of a fuel and reduction of oxygen). Suitable catalysts include platinum, ruthenium, osmium, platinum-ruthenium alloys, platinum-osmium alloys, platinum-palladium alloys, and platinum-M alloys, where M is at least one metal selected from the group consisting of Ga, Ti, V, Cr, Mn, Fe, Co, Ni, Cu, and Zn, and combinations thereof. Preferred catalysts are selected from the group consisting of platinum, ruthenium, osmium, platinum-ruthenium alloys, platinum-osmium alloys, platinum-palladium alloys, platinum-cobalt alloys, and platinum-nickel alloys.

According to one embodiment of the present invention, a fuel cell system may have a lower catalyst loading for the anode than for a conventional direct oxidation fuel cell. Therefore, the present invention may reduce the cost of manufacturing a fuel cell.

Unlike a fuel cell using the same material for an anode and a cathode, a direct oxidation fuel cell includes an alloy catalyst such as platinum-ruthenium for the anode. This helps prevent catalyst poisoning due to CO generated during the anode reaction.

Such a metal catalyst may be used in a form of a metal itself (black catalyst), or one supported in a carrier. The carrier may include carbon such as acetylene black, denka black, activated carbon, ketjen black, or graphite, or an inorganic particulate such as alumina, silica, zirconia, or titania. In general, carbon may be used.

The polymer electrolyte membrane may include a polymer with excellent proton-conductivity, and it exchanges ions, that is it transfers protons generated at an anode to a catalyst layer of a cathode.

The polymer electrolyte membrane may include any polymer resin having a cation exchange group selected from the group consisting of a sulfonic acid group, a carboxylic acid group, a phosphoric acid group, a phosphonic acid group, and derivatives thereof at its side chain.

Non-limiting examples of the polymer include at least one proton conductive polymer selected from the group consisting of perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In a preferred embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole). In general, the polymer electrolyte membrane has a thickness ranging from 10 to 200 µm.

The separator is formed of a metal or graphite, and has a flow channel for supplying the anode with the fuel and the cathode with the oxidant.

The oxidant supplier supplies the electricity generating element with an oxidant. Suitable oxidants include oxygen and air.

Figure 5:
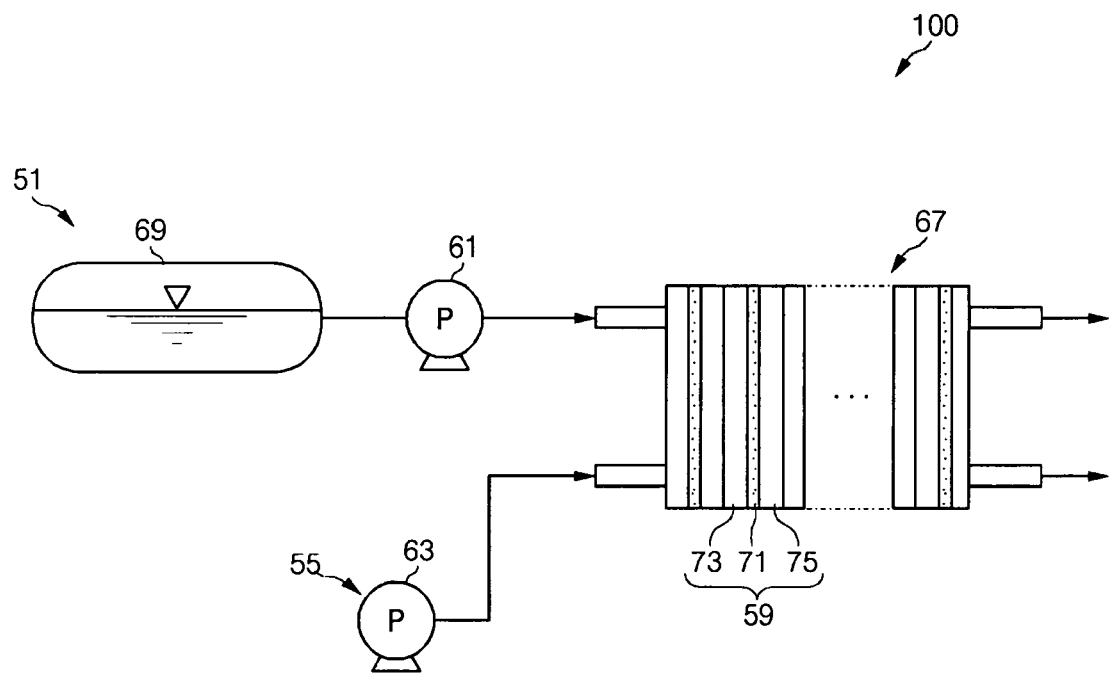
FIG. 5 schematically illustrates a fuel cell system according to the present invention.

FIG. 5 shows a schematic structure of a fuel cell system that will be described in detail. According to FIG. 5, a fuel cell system is illustrated in which fuel and oxidant are provided to the electricity generating element through pumps, but the present invention is not limited to such structures. The fuel cell system may alternatively include a structure in which a fuel and an oxidant are provided in a diffusion manner or in various other manners.

A fuel cell system 100 includes a stack 67 composed of at least one electricity generating element 59 that generates electrical energy through electrochemical reaction of a fuel and an oxidant, a fuel supplier 51 supplies the electricity generating element 59 with the fuel, and an oxidant supplier 55 supplies the electricity generating element 59 with the oxidant.

In addition, the fuel supplier 51 includes a tank 69 that stores a fuel, and a fuel pump 61 that supplies the fuel stored in the tank 9 to the stack 67.

The oxidant supplier 55, which supplies the electricity generating element 59 of the stack 67 with an oxidant, includes at least one pump 63 for supplying the oxidant to the stack 67.

The electricity generating element 59 includes at least one membrane-electrode assembly 71, which oxidizes hydrogen or a fuel and reduces an oxidant, and separators 73 and 75 that are respectively positioned at opposite sides of the membrane-electrode assembly and may respectively supply hydrogen or a fuel and an oxidant.

The following examples illustrate the present invention in more detail. However, it is understood that the present invention is not limited by these examples.

Example 1

88 wt % of Pt-Ru black (manufactured by Johnson Matthey Co.) and Pt black (manufactured by Johnson Matthey Co.) catalysts and 12 wt % of Nafion/$H_2O$/2-propanol (Solution Technology Inc.) in a 5 wt % concentration as a binder were used to form a cathode and an anode. The catalysts at the cathode and anode were loaded at 8 mg/$cm^2$.

The prepared cathode and anode and a commercial NAFION™ 115 (perfluorosulfonic acid) polymer electrolyte membrane were used to fabricate a unit cell.

The unit cells were formed into a stack, and thereafter, a fuel prepared by mixing 1M of methanol and water was supplied into the stack, and hydrogen gas was also supplied into the stack at a rate of 0.7 ml/min.

Example 2

The method of Example 1 was repeated, except that hydrogen gas was injected at a rate of 2 ml/min.

Comparative Example 1

The methods of Examples 1 and 2 were repeated, except that hydrogen gas was not injected.

The cells fabricated in Examples 1 and 2 and Comparative Example 1 were estimated to have a power output density at 0.3V and 0.4V, and the results are provided in the following table.

TABLE 1

| mW/cm², 50° C. | Power Density | | |
| --- | --- | --- | --- |
| | Comparative Example 1 | Example 1 | Example 2 |
| 0.4 V | 35 | 36 | 43 |
| 0.3 V | 39 | 42 | 58 |

As shown in Table 1, the cells according to Examples 1 and 2, which were fabricated by injecting hydrogen with a methanol fuel into an anode, exhibited higher power output densities than the cell of Comparative Example 1, which was operated by injecting only a methanol fuel.

Therefore, by supplying an anode with hydrogen as well as a fuel, a direct oxidation fuel cell system according to the present invention may have a high power output.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A direct oxidation fuel cell system comprising:
   at least one electricity generating element comprising a membrane-electrode assembly comprising an anode, a cathode, and a polymer electrolyte membrane, and a separator;
   a fuel supplier comprising a fuel source and a hydrogen source and adapted to supply the electricity generating element with a combination of fuel from the fuel source and hydrogen from the hydrogen source, the hydrogen source being stored hydrogen gas, stored liquid hydrogen, or hydrogen gas generated through a reformer, the fuel supplier being configured with the electricity generating element to provide gaseous hydrogen in an amount from 0.1 to 10 parts by volume based on 100 parts by volume of the fuel or liquid hydrogen in an amount from 1 to 70 parts by weight based on 100 parts by weight of the fuel; and
   an oxidant supplier adapted to supply the electricity generating element with an oxidant.

2. The direct oxidation fuel cell system of claim 1, wherein the hydrogen source is gaseous hydrogen that is provided in an amount from 0.1 to 10 parts by volume based on 100 parts by volume of the fuel.

3. The direct oxidation fuel cell system of claim 2, wherein the hydrogen source is gaseous hydrogen that is provided in an amount from 0.1 to 5 parts by volume based on 100 parts by volume of the fuel.

4. The direct oxidation fuel cell system of claim 1, wherein the hydrogen source is liquid hydrogen, and the hydrogen is provided in an amount from 1 to 70 parts by weight based on 100 parts by weight of the fuel.

5. The direct oxidation fuel cell system of claim 4, wherein the hydrogen source is liquid hydrogen, and the hydrogen is provided in an amount from 1 to 30 parts by weight based on 100 parts by weight of the fuel.

6. The direct oxidation fuel cell system of claim 1, wherein the at least one electricity generating element comprises a stack comprising the cathode having a catalyst layer with an open region, the anode, and the membrane-electrode assembly.

7. The direct oxidation fuel cell system of claim 6, wherein the catalyst is selected from the group consisting of platinum, ruthenium, osmium, platinum-ruthenium alloys, platinum-osmium alloys, platinum-palladium alloys, platinum-M alloys where M is one or more elements selected from the group consisting of Ga, Ti, V, Cr, Mn, Fe, Co, Ni, Cu, and Zn, and combinations thereof.

8. A direct oxidation fuel cell system comprising:
   at least one electricity generating element comprising a membrane-electrode assembly comprising an anode, a cathode, and, a polymer electrolyte membrane, and a separator, wherein the cathode includes a catalyst layer with an open region;
   a fuel supplier comprising a fuel source and a hydrogen source and adapted to supply the electricity generating element with a combination of fuel from the fuel source and hydrogen from the hydrogen source, the hydrogen source being stored hydrogen gas, stored liquid hydrogen, or hydrogen gas generated through a reformer, the fuel supplier being configured with the electricity generating element to provide gaseous hydrogen in an amount from 0.1 to 10 parts by volume based on 100 parts by volume of the fuel or liquid hydrogen in an amount from 1 to 70 parts by weight based on 100 parts by weight of the fuel; and
   an oxidant supplier adapted to supply the electricity generating element with an oxidant.

9. The direct oxidation fuel cell system of claim 8, wherein the hydrogen is provided in a state selected from vapor and compressed liquid.

10. A method for operating a direct oxidation fuel cell system, the fuel cell system comprising at least one membrane-electrode assembly comprising an anode, a cathode, and a polymer electrolyte membrane, the method comprising feeding a combination of fuel from a hydrocarbon fuel source and hydrogen from a hydrogen source to the anode, the hydrogen source being stored hydrogen gas, stored liquid hydrogen, or hydrogen gas generated through a reformer, the feeding of the hydrogen comprising providing gaseous hydrogen in an amount from 0.1 to 10 parts by volume based on 100 parts by volume of the fuel or providing liquid hydrogen in an amount from 1 to 70 parts by weight based on 100 by weight of the fuel.

11. The method of claim 10, wherein the hydrogen source is provided as gaseous hydrogen that is provided in an amount from 0.1 to 10 parts by volume based on 100 parts by volume of the fuel.

12. The method of claim 10, wherein the hydrogen source is provided as gaseous hydrogen that is provided in an amount from 0.1 to 5 parts by volume based on 100 parts by volume of the fuel.

13. The method of claim 10, wherein the hydrogen source is provided as liquid hydrogen, and the hydrogen is provided in an amount from 1 to 70 parts by weight based on 100 parts by weight of the fuel.

14. The method of claim 10, wherein the hydrogen source is provided as liquid hydrogen, and the hydrogen is provided in an amount from 1 to 30 parts by weight based on 100 parts by weight of the fuel.

* * * * *

UNITED STATES PATENT AND TRADEMARK OFFICE
CERTIFICATE OF CORRECTION

| | | |
|---|---|---|
| PATENT NO. | : 7,985,511 B2 | |
| APPLICATION NO. | : 11/491441 | |
| DATED | : July 26, 2011 | |
| INVENTOR(S) | : In-Hyuk Son et al. | |

It is certified that error appears in the above-identified patent and that said Letters Patent is hereby corrected as shown below:

In the Claims

Column 8, Claim 8, line 14.    After "cathode,"
                               Delete "and,"
                               Insert -- and --

Column 8, Claim 10, line 45.   After "100"
                               Insert -- parts --

Signed and Sealed this
Tenth Day of July, 2012

David J. Kappos
*Director of the United States Patent and Trademark Office*